United States Patent
Ye et al.

(10) Patent No.: US 12,038,013 B2
(45) Date of Patent: Jul. 16, 2024

(54) MOTOR DRIVE SHAFT SPRING CLUTCH IN ELECTRICAL SUBMERSIBLE PUMP

(71) Applicant: Baker Hughes Oilfield Operations LLC, Houston, TX (US)

(72) Inventors: Zheng Ye, Claremore, OK (US); Randal Perisho, Tulsa, OK (US)

(73) Assignee: BAKER HUGHES OILFIELD OPERATIONS, LLC, Houston, TX (US)

( * ) Notice: Subject to any disclaimer, the term of this patent is extended or adjusted under 35 U.S.C. 154(b) by 144 days.

(21) Appl. No.: 17/874,869

(22) Filed: Jul. 27, 2022

(65) Prior Publication Data

US 2023/0051162 A1    Feb. 16, 2023

Related U.S. Application Data

(63) Continuation-in-part of application No. 17/307,986, filed on May 4, 2021, now Pat. No. 11,608,721.

(Continued)

(51) Int. Cl.
*F16D 41/20*    (2006.01)
*E21B 43/12*    (2006.01)
(Continued)

(52) U.S. Cl.
CPC .......... *F04D 29/044* (2013.01); *E21B 43/128* (2013.01); *F04D 13/10* (2013.01); *F16D 41/206* (2013.01); *H02K 7/108* (2013.01)

(58) Field of Classification Search
CPC ...... E21B 43/128; F04D 13/10; F04D 29/044; F04D 29/106; F04D 13/022;
(Continued)

(56) References Cited

U.S. PATENT DOCUMENTS 2,838,938 A * 6/1958 Sacchini ................. F02N 15/04
                                                123/179.26
2,895,578 A * 7/1959 Winchell .............. F16D 41/206
                                                    192/72

(Continued)

FOREIGN PATENT DOCUMENTS

| EP | 0153079 A1 | 8/1985 |
|---|---|---|
| WO | 2010030272 A1 | 3/2010 |
| WO | 2017153851 A1 | 9/2017 |

OTHER PUBLICATIONS

International Search Report and Written Opinion for related PCT application PCT/US2019/037602 dated Oct. 2, 2019: pp. 1-9.

(Continued)

*Primary Examiner* — Dominick L Plakkoottam
(74) *Attorney, Agent, or Firm* — BRACEWELL LLP; Keith R. Derrington

(57) ABSTRACT

An electrical submersible well pump assembly has shaft couplings. One of the couplings has a lower hub that rotates in unison with the motor shaft and an upper hub that rotates in unison with the pump shaft. A helical spring clutch engages both hubs when the motor shaft is being driven by the motor. Ceasing driving rotation of the motor shaft causes the spring clutch to disengage from the upper hub, enabling the pump shaft to rotate the upper hub without rotating the lower hub.

17 Claims, 8 Drawing Sheets

Related U.S. Application Data

(60) Provisional application No. 63/020,839, filed on May 6, 2020.

(51) Int. Cl.
  *F04D 13/10* (2006.01)
  *F04D 29/044* (2006.01)
  *H02K 7/108* (2006.01)

(58) Field of Classification Search
  CPC .... F16D 41/206; F16D 1/10; F16D 2001/103; H02K 5/132; H02K 7/108; F05D 2260/52
  See application file for complete search history.

(56) References Cited

U.S. PATENT DOCUMENTS

| | | | | |
|---|---|---|---|---|
| 4,232,770 | A * | 11/1980 | Tuzson | F16D 13/04 192/93 A |
| 4,262,786 | A * | 4/1981 | Taylor | F16D 41/12 192/48.92 |
| 4,763,764 | A * | 8/1988 | Smith | F16D 43/18 192/72 |
| 5,350,242 | A | 9/1994 | Wenzel | |
| 10,323,644 | B1 * | 6/2019 | Shakirov | F04D 13/10 |
| 11,608,721 | B2 * | 3/2023 | Perisho | H02K 5/132 |
| 2002/0056602 | A1 | 5/2002 | Aurora | |
| 2007/0068163 | A1 * | 3/2007 | Ishikawa | B63H 21/20 60/700 |
| 2008/0108442 | A1 * | 5/2008 | Jansen | F16D 7/022 464/54 |
| 2009/0202371 | A1 * | 8/2009 | Green | F04C 13/008 417/423.3 |
| 2009/0291003 | A1 * | 11/2009 | Brown | E21B 43/128 417/410.3 |
| 2011/0171047 | A1 * | 7/2011 | Parmeter | F04B 47/02 29/525.02 |
| 2013/0101447 | A1 * | 4/2013 | Brown | F04B 17/03 29/888.02 |
| 2015/0275581 | A1 | 10/2015 | Agarwal et al. | |
| 2015/0285365 | A1 * | 10/2015 | Canto Michelotti | F16D 3/72 474/94 |
| 2017/0234321 | A1 * | 8/2017 | Meyer | F04D 13/10 415/1 |
| 2017/0241480 | A1 * | 8/2017 | Parmeter | E21B 43/128 |
| 2017/0306731 | A1 * | 10/2017 | Xiao | F04B 47/06 |
| 2020/0063541 | A1 | 2/2020 | Davis | |
| 2020/0166088 | A1 * | 5/2020 | Leonov | F16D 41/185 |
| 2021/0324867 | A1 | 10/2021 | Perisho | |
| 2021/0348488 | A1 | 11/2021 | Perisho et al. | |
| 2023/0051162 | A1 | 2/2023 | Ye et al. | |

OTHER PUBLICATIONS

International Search Report and Written Opinion of PCT Application No. PCT/US2021/070513 dated Aug. 12, 2021: pp. 1-9.
U.S. Appl. No. 17/233,207, "Shear Pin and Drive Shaft Spring Brake in Electrical Submersible Pump", filed Apr. 16, 2021.
International Search Report and Written Opinion for PCT Application No. PCT/US2023/028495 dated Nov. 3, 2023.

\* cited by examiner

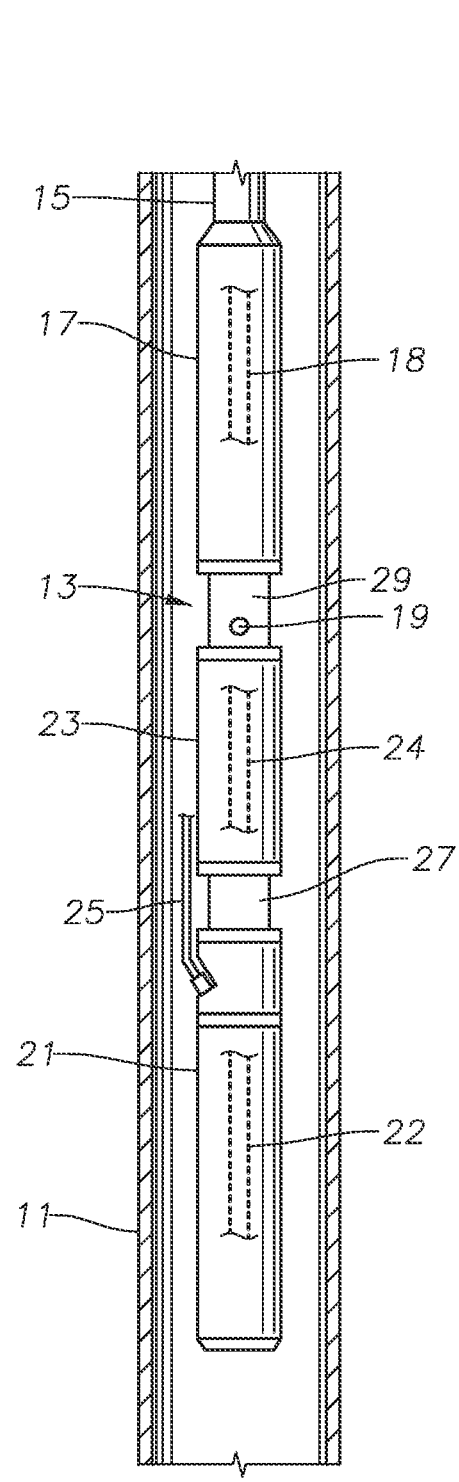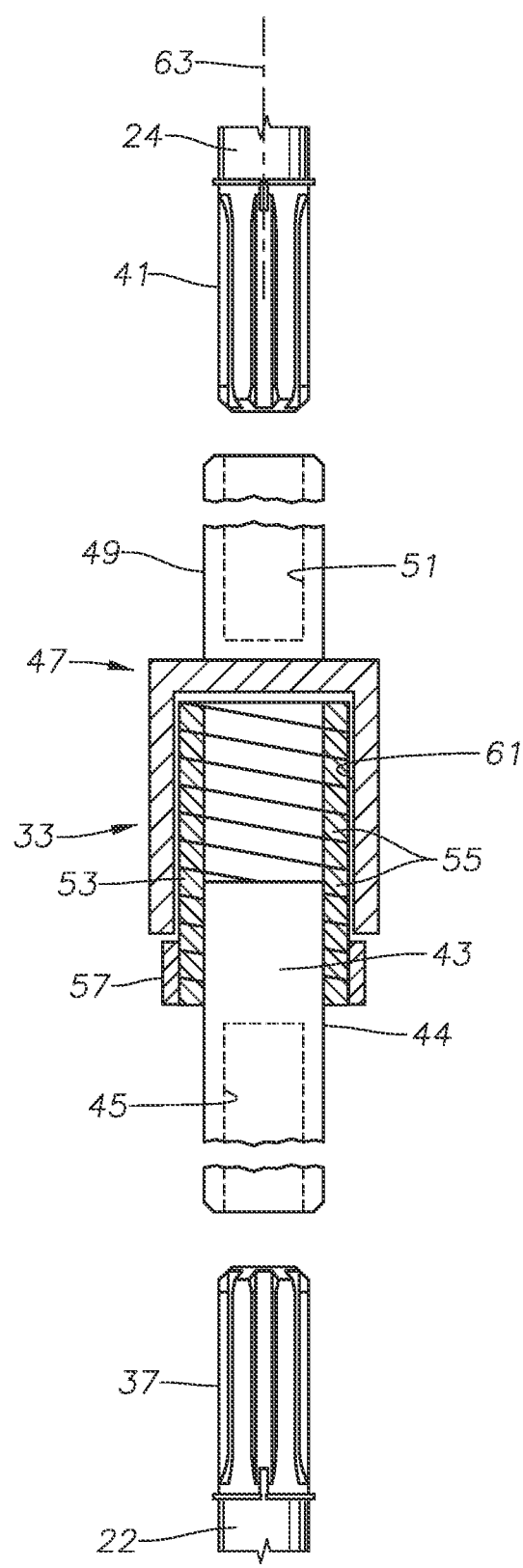
FIG. 1
FIG. 2

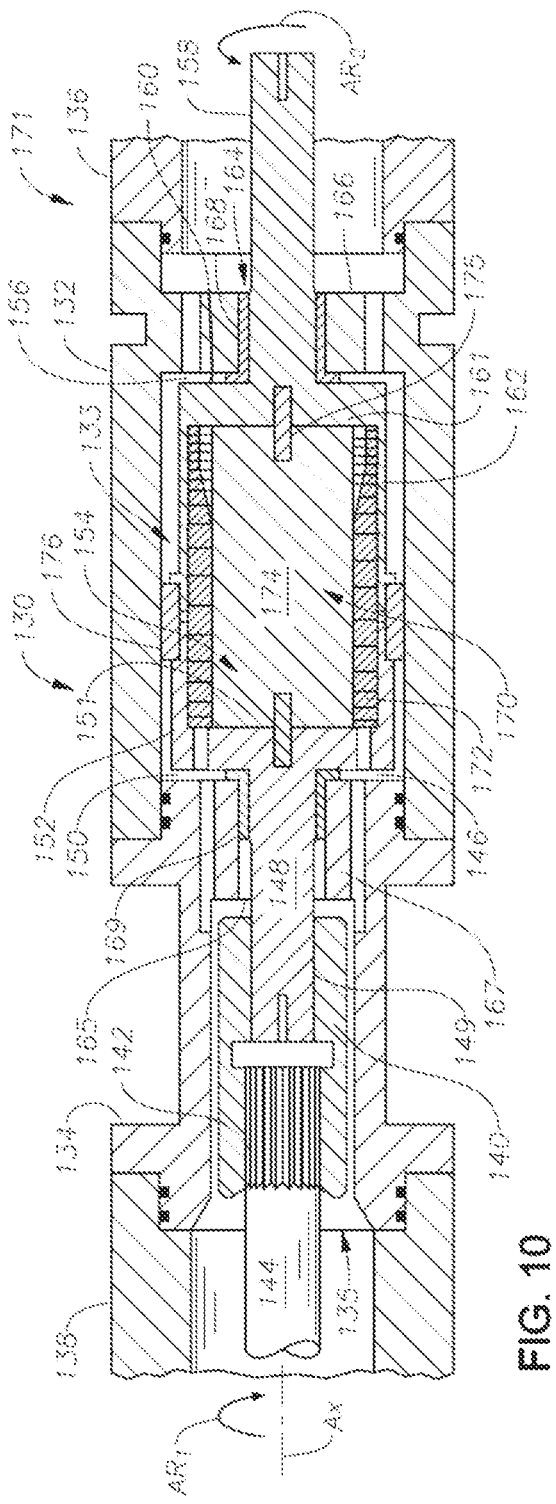
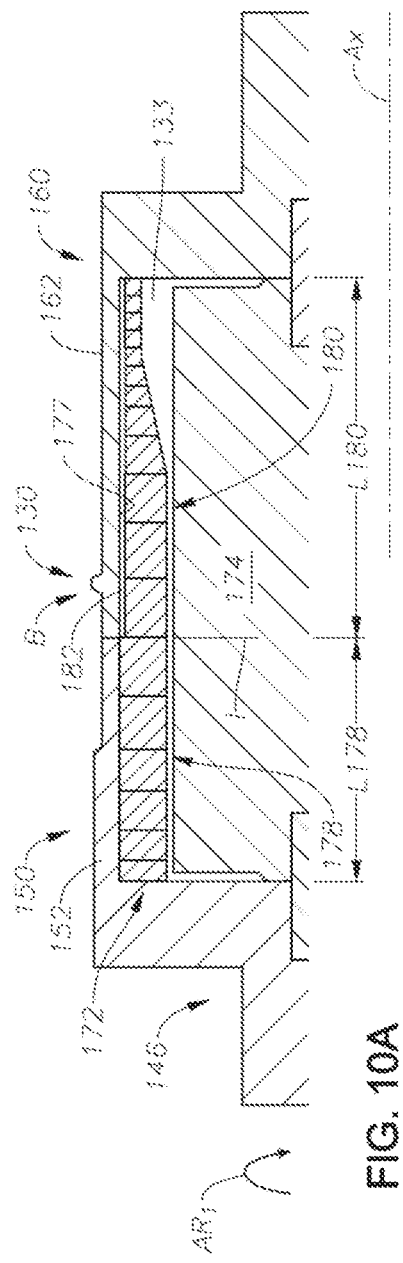
FIG. 10
FIG. 10A

MOTOR DRIVE SHAFT SPRING CLUTCH IN ELECTRICAL SUBMERSIBLE PUMP

CROSS-REFERENCE TO RELATED APPLICATION

This application is a continuation-in-part of and claims priority to and the benefit of co-pending U.S. patent application Ser. No. 17/307,986, filed May 4, 2021, which has since issued as Perisho et al., U.S. Pat. No., 11,608,721 on May 21, 2023, and which claimed priority from U.S. Provisional Application Ser. No. 63/020,839 filed May 6, 2020, the full disclosures of which are incorporated by reference herein in their entireties and for all purposes.

BACKGROUND OF THE INVENTION

1. Field of Invention

This disclosure relates in general to electrical submersible well pumps (ESP), and in particular to a clutch mechanism that prevents spinning of the motor drive shaft unless power is being supplied to the motor.

2. Description of Prior Art

ESPs are commonly used in hydrocarbon producing wells. A typical ESP includes an electrical motor having a rotating drive shaft that drives the pump. The pump may be a centrifugal pump or another type. The motor is typically a three-phase AC motor of an induction electric type, but permanent magnet motors are also employed.

There are occasions when well fluid flows through the pump while the motor is not being powered. The flowing well fluid through the pump can cause the motor shaft to spin, which can generate an electrical charge, particularly if the motor is a permanent magnet type. The electrical charge can be dangerous to nearby technicians. One instance can occur when the ESP is being run into the well on production tubing. Well fluid can flow up through the pump, resulting in forward spinning of the motor shaft. Technicians normally deploy a power cable at the same time and strap the power cable onto the production tubing every 20 feet or so. The terminals at the upper end of the power cable could be exposed and electrocute the technician.

Another instance occurs upon retrieval with production tubing. Technicians at the wellhead will be stopping the upward pull every 20 feet or so to remove the straps of the power cable to the tubing. Well fluid previously in the pump and production tubing can drain out the pump intake, causing the pump to reverse spin. The reverse spinning of the pump causes reverse spinning of the motor shaft, which can also generate an electrical charge. The electrical charge could be present on the terminals of the power cable, which may be disconnected from the power supply during retrieval.

In addition, when the ESP is shut down, the column of well fluid in the tubing can flow downward through the pump, causing reverse spinning of the motor shaft. The reverse spinning motor shaft can generate an electrical charge.

Helical spring brakes are known to be used on helicopter shafts and washing machine shafts for various purposes. However, helical spring brakes have not been configured and mounted to ESP shaft assemblies.

SUMMARY OF THE INVENTION

Disclosed is an example of an electrical submersible well pump assembly ("ESP") that includes an electrical motor, a pump, and a drive train. The drive train of this example is made up of a motor shaft coupled to the electrical motor, a pump shaft coupled to the pump, and a connector having a driven hub assembly. The driven hub assembly includes a driven hub shaft having an end coupled with the pump shaft, a driven hub receptacle connected to an end of the driven hub shaft that is distal from the pump shaft, and a driven hub cavity formed in the driven hub receptacle. Also included is a helical spring with a fixed portion and a flex portion that inserts into the driven hub cavity, when the spring is rotationally static an outer surface of the flex portion is spaced radially inward from an inner surface of the hub receptacle and when the spring is rotated in a first direction the flex portion outer surface radially expands into contact with the inner surface of the hub receptacle so that the spring is rotationally coupled to the driven hub assembly and a drive hub assembly having an end coupled to the motor shaft and an opposing end affixed to the fixed end of the spring. In an example, energizing the electrical motor rotates the motor shaft and drive hub assembly to rotate the spring in the first direction. Optionally coils in the flex portion have a radial thickness that reduces with distance from the fixed portion. In alternatives, coils in the flex portion have an axial thickness that reduces with distance from the fixed portion. In an embodiment, the drive hub assembly further includes a drive hub receptacle, a drive hub cavity in the drive hub receptacle that receives and attaches to an end of the fixed portion, a drive hub shaft having an end that attaches to the electrical motor and an opposing end that attaches to the drive hub receptacle. In an example, a length of the spring disposed in the driven hub receptacle exceeds a length of the spring disposed in the drive hub receptacle. The ESP further optionally includes a seal section disposed between the electrical motor and the pump, and where the drive train extends through the seal section. The spring is optionally rotated in a second direction that is opposite the first direction, the outer surface of the flex portion is spaced radially inward from the sidewalls of the driven hub receptacle and the driven hub receptacle is freely rotatable with respect to the spring. The ESP alternatively further includes a clutch spring for arresting rotation of the driven hub assembly.

Another example of an electrical submersible well pump assembly ("ESP") includes an electrical motor having a motor shaft is rotated in a first direction when the electrical motor is energized, a pump having a pump shaft, and a drive train with a connector with opposing ends coupled to the motor and pump shafts, the connector made up of drive and driven hub assemblies that each have receptacles and shafts connected to the receptacles that couple respectively to the pump shaft and motor shaft, and a helical spring with an end affixed in the drive hub assembly receptacle and an opposing end inserted into the driven hub assembly receptacle that when rotationally static is spaced radially inward from inner sidewalls of the driven hub assembly receptacle and that when rotated in the first direction expands radially outward into engaging contact so that the drive and driven hub assemblies are rotationally coupled. An example of the helical spring includes coils, and where the coils in the driven hub assembly have a radial thickness that reduces with distance from the drive hub assembly, or optionally, the coils in the driven hub assembly have an axial thickness that reduces with distance from the drive hub assembly. In an example, when the spring is rotated in a direction that is opposite the first direction, the outer surface of the spring is spaced radially inward from the sidewalls of the driven hub receptacle and the driven hub receptacle is freely rotatable with respect to the spring.

Another example of an electrical submersible well pump assembly ("ESP") includes an electrical motor that has a motor shaft that is rotated in a first direction when the electrical motor is energized, a pump having a pump shaft, and a drive train having an end rotationally coupled with the motor shaft and an opposing end coupled with the pump shaft. In this example the drive train includes a connector with a helical spring that when rotated in the first direction radially expands and couples with a driven member in the connector to transmit rotational force through the connector, and that when rotationally static decouples from the driven member and defines a break in the drive train. Further optionally in this example, the break is in the drive train when the spring is rotated in a direction opposite to the first direction. The connector further optionally includes a drive member affixed to an end of the spring distal from the driven member, and where radial and axial dimensions of the spring are reduced with distance away from the drive member. In alternatives, the driven member has an annular receptacle that defines a cylindrically shaped cavity in which the spring is inserted, and where a taper is formed along an inner surface of the receptacle.

BRIEF DESCRIPTION OF DRAWINGS

Some of the features and benefits of the present invention having been stated, others will become apparent as the description proceeds when taken in conjunction with the accompanying drawings, in which:

FIG. 1 is a side view an ESP supported on tubing, the ESP being in accordance with this disclosure.

FIG. 2 is a schematic sectional and exploded view of the coupling between the seal section shaft and motor shaft of FIG. 1, the coupling being shown in a position when the motor is not powered.

FIG. 10 is a schematic side sectional view of another alternate embodiment of the coupling of FIG. 2.

FIG. 10A is a side sectional enlarged view of a portion of the example coupling of FIG. 10.

Figure 3:
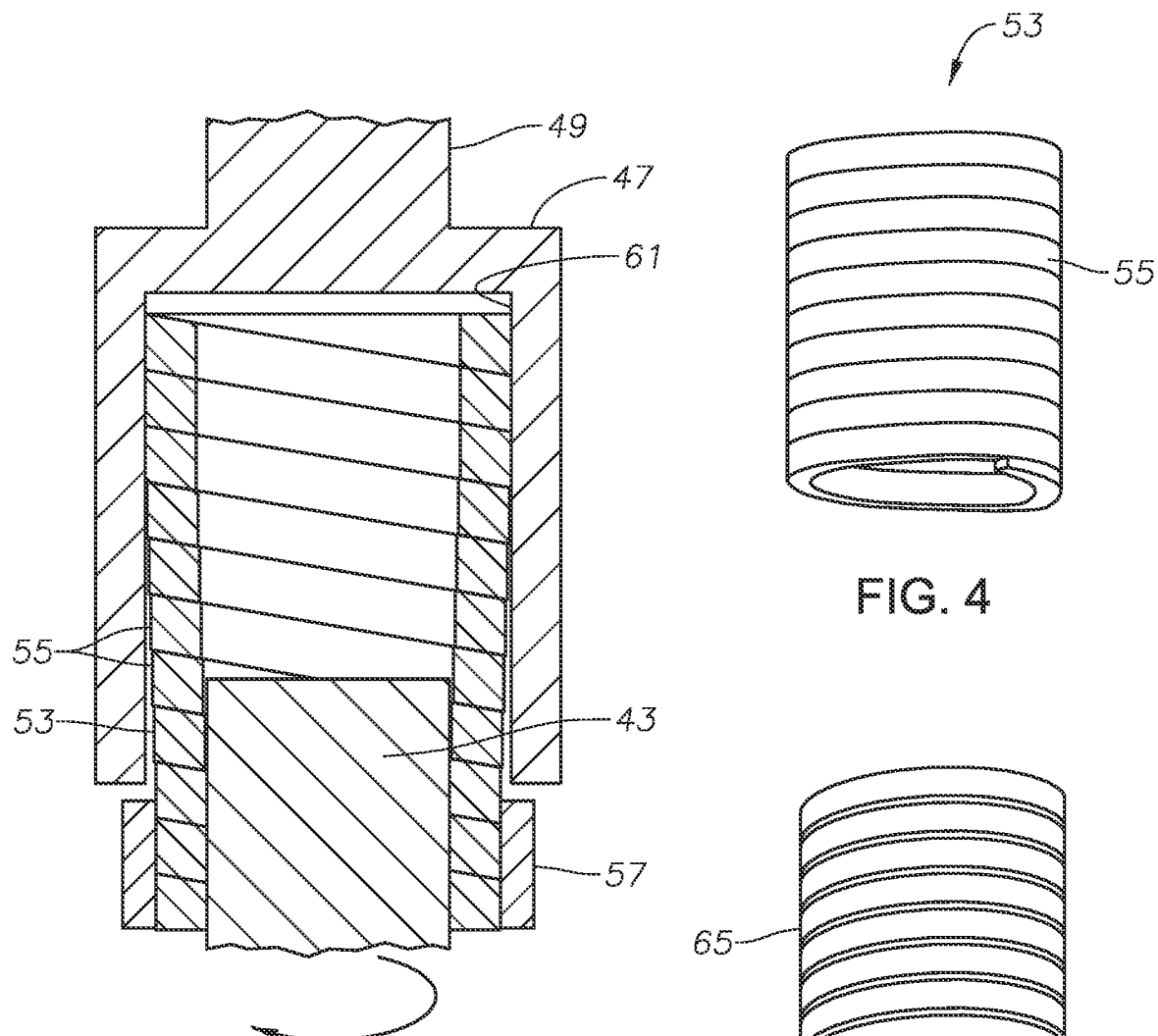
FIG. 3 is a schematic sectional view of the coupling of FIG. 2 while the motor is powered.

While subject matter is described in connection with embodiments disclosed herein, it will be understood that the scope of the present disclosure is not limited to any particular embodiment. On the contrary, it is intended to cover all alternatives, modifications, and equivalents thereof.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of a cited magnitude. In an embodiment, the term "substantially" includes +/−5% of a cited magnitude, comparison, or description. In an embodiment, usage of the term "generally" includes +/−10% of a cited magnitude. The terms "upper", "lower" and the like are used only for convenience as the ESP may be operated in positions other than vertical.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, the well has casing 11 cemented in place. In this embodiment, a wellhead (not shown) at the surface supports an electrical submersible pump (ESP) 13 on a string of production tubing 15. ESP 13 includes a pump 17, which is illustrated to be a centrifugal pump with a large number of pump stages, each stage having a rotatable impeller and a non-rotating diffuser. Other types of pumps are feasible, such as positive displacement pumps. Pump 17 has a rotationally driven pump shaft 18 and intake port 19 for drawing in well fluid from casing 11 and discharging the well fluid into production tubing 15. A rotary gas separator (not shown) could be mounted to the lower end of pump 17 for separating gas from liquid in the well fluid flowing into pump 17. If so, pump intake port 19 would be in the gas separator and the drive shaft within the gas separator may be considered to be a lower extension of pump shaft 18.

A motor 21 with a motor shaft 22 drives pump shaft 18 of pump 17. Motor 21 is typically a three-phase electrical motor filled with a dielectric lubricant. Motor 21 may be a permanent magnet motor having a rotor containing permanent magnets that rotate in response to electromagnetic fields of a non-rotating stator.

A seal section 23 connected between motor 21 and pump 17 has a pressure equalizer that reduces a pressure differential between the lubricant in motor 21 and well fluid on the exterior. Alternately, the pressure equalizer could be mounted below motor 21. Seal section 23 has a seal section shaft 24 that drives pump shaft 18 and is driven by motor shaft 22. A power cable 25 with a motor lead extension on its lower end extends downward from the wellhead along-side production tubing 15 to a receptacle on an upper portion of motor 21 for powering motor 21.

Rather than production tubing 15, ESP 13 could be supported on a string of coiled tubing, which is a continuous steel tube deployed from a reel at the surface. ESP coiled tubing has a power cable inside rather than on the exterior. In that instance, motor 21 and seal section 23 would be above pump 17, and pump 17 would discharge into an annulus surrounding motor 21.

In the FIG. 1 embodiment, a first or lower connector 27 connects motor 21 to seal section 23, and a second or upper connector 29 connects seal section 23 to pump 17. If a rotary gas separator is employed, second connector 29 would connect seal section 23 to the gas separator. A third connector would connect the gas separator to the pump.

Referring to FIG. 2, a clutch coupling 33 will be located within one of the connectors 27, 29, and in this example, clutch coupling 33 is a motor/seal section coupling located in first connector 27. Motor shaft 22 has a splined upper end 37 in engagement with a lower portion of clutch coupling 33. Seal section shaft 24 has a lower splined end 41 that is engagement with an upper portion of clutch coupling 33. A conventional coupling (not shown) will connect seal section shaft 24 to pump shaft 18 in this example.

When motor 21 is powered to drive motor shaft 22, clutch coupling 33 transfers the driving rotation of motor shaft 22 to seal section shaft 24, which in turn transfers the driving rotation to pump shaft 18. Even if motor 21 is not powered, pump shaft 18 can rotate in a normal driving direction while ESP 13 is being lowered into casing 11 during installation due to well fluid flowing upward through pump intake ports 19. Also, after installation if motor 21 shuts down, well fluid flowing back down tubing 15 can flow downward through pump 17 and out intake ports 19, causing pump shaft 18 to spin in reverse. Further, upon retrieval, at times well fluid can drain out of pump 17, causing reverse spinning of pump shaft 18. When motor 21 is not driving motor shaft 22, clutch coupling 33 prevents pump shaft 18 from rotating motor shaft 22 in either the normal driving direction or the reverse direction.

In this embodiment, by locating clutch coupling 33 in first connector 27, it will be immersed in and lubricated by dielectric motor lubricant of motor 21. Alternately, clutch coupling 33 could be located within second connector 29, however it would be immersed and lubricated by well fluid, rather than motor lubricant.

In this example, clutch coupling 33 has a lower or motor end hub 43 with an integrally formed adapter 44 on its lower end. Adapter 44 has an internally splined socket 45 that receives splined upper end 37 of motor shaft 22. Other types of connections are feasible, including making adapter 44 and lower hub 43 an integral part of motor shaft 22. Lower hub 43 is a cylindrical rod, stub shaft, or pedestal in this embodiment. Clutch coupling 33 has an upper or pump end hub 47 with an adapter 49 having an internally splined socket 51 facing upward for receiving the lower splined end 41 of seal section shaft 24.

Clutch coupling 33 has a helical coiled clutch spring 53 comprising helical turns 55 extending from the lower or motor end to the upper or pump end. Both the lower and upper ends of helical turns 63 are free prior to installation in clutch coupling 33.

Figure 4:
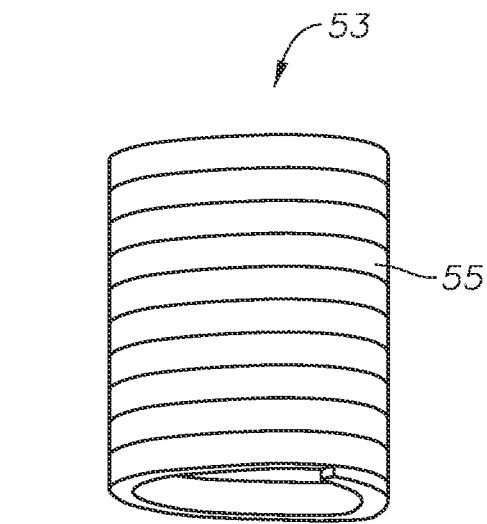
FIG. 4 is a perspective view of the spring clutch of the coupling of FIG. 2, shown removed from the coupling.

Clutch spring 53, shown also in FIG. 4, may be manufactured by making a helical cut through the wall of a tubular block of metal. When viewed in an axial cross-section, as shown in FIG. 3, each helical turn 55 has a rectangular shape in this example. When looking downward from the upper end, helical turns 55 define a counterclockwise helical path extending in the opposite direction from the driving direction of motor shaft 22. The normal driving direction of motor shaft 22 in these embodiments is clockwise, but it could be reversed.

The lower end of clutch spring 53 is fixed to lower hub 43 for rotation therewith in this embodiment. One technique for securing clutch spring 53 to lower hub 43 employs a shrink ring or clamp 57 that clamps the lower portion of clutch spring 55 tightly around lower hub 43. Shrink ring 57 may be a solid annular member that employs a thermal process to cause it to shrink in diameter so that it can be first inserted over lower hub 43, then shrunk to tightly clamp the lower end of clutch spring 53 to lower hub 43. For example, shrink ring 57 may be a shape memory alloy such as Nitinol that shrinks when heat is applied and retains the smaller diameter after the heat is removed. Shrink ring 57 clamps only the lower portion of helical turns 55, and the remaining turns 55 may retain their original diameter.

In this embodiment, upper hub 47 is a receptacle with an open lower end. Upper hub 47 has an inner cylindrical sidewall 61 that faces inward toward longitudinal axis 63 of clutch coupling 33. The upper portion of clutch spring helical turns 55 fits within the receptacle defined by upper hub 47. Initially, the upper portion of helical turns 55 are spaced radially inward from upper hub sidewall 61 by a slight clearance; or they could be lightly touching. The touching contact would only be a few degrees of contact of helical turns 55 due to manufacturing tolerances. In this example, no complete 360 degree turn of clutch spring 53 initially contacts sidewall 61.

Referring to FIG. 3, when motor shaft 22 (FIG. 1) drives lower hub 43 as indicated by the arrow, clutch spring 53 will rotate in unison. The upper portion of helical turns 55 expand radially outward in response to the centrifugal force of the rotation, coming into tight gripping engagement with upper hub inner sidewall 61. The gripping engagement causes upper hub 47 to rotate in unison, driving seal section shaft 24 (FIG. 2) and pump shaft 18 (FIG. 1). The gripping engagement ceases once motor 21 stops driving motor shaft 22. The helical turns 55 within upper hub 47 will retract in diameter and lose the gripping engagement with sidewall 61 due to the loss of centrifugal force.

If pump shaft 18 (FIG. 1) starts to spin in the normal driving direction during initial installation while power to motor 21 is off, this driving direction rotation would cause rotation of seal section shaft 24 and upper hub 47, but not clutch spring 53 because of the clearance between helical turns 55 and upper hub sidewall 61. Similarly, if pump shaft 18 begins to spin in the reverse direction while power to motor 21 is off, upper hub 47 would also spin in the reverse direction but not clutch spring 53 because of the lack of gripping engagement with sidewall 61.

Figure 5:
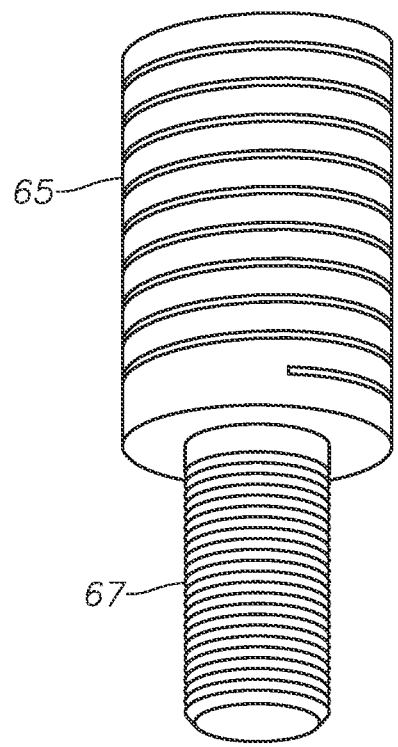
FIG. 5 is a perspective view of an alternate embodiment of the spring clutch of FIG. 4, shown removed from the coupling assembly.

FIG. 5 illustrates a spring clutch 65 as an alternate embodiment of spring clutch 53. Rather than shrink ring 57 (FIG. 2), a screw 67 depends from a closed lower end of spring clutch 65. Screw 67 engages a threaded hole in lower hub 43 to secure the lower portion of spring clutch 65 to lower hub 43 for rotation. The upper portion of spring clutch 65 would engage upper hub sidewall 61 (FIG. 2) in response to driving rotation of lower hub 43 in the same manner as described in connection with FIGS. 2-4. The threads of screw 67 are in a direction that tightens when motor shaft 22 turns.

Figure 6:
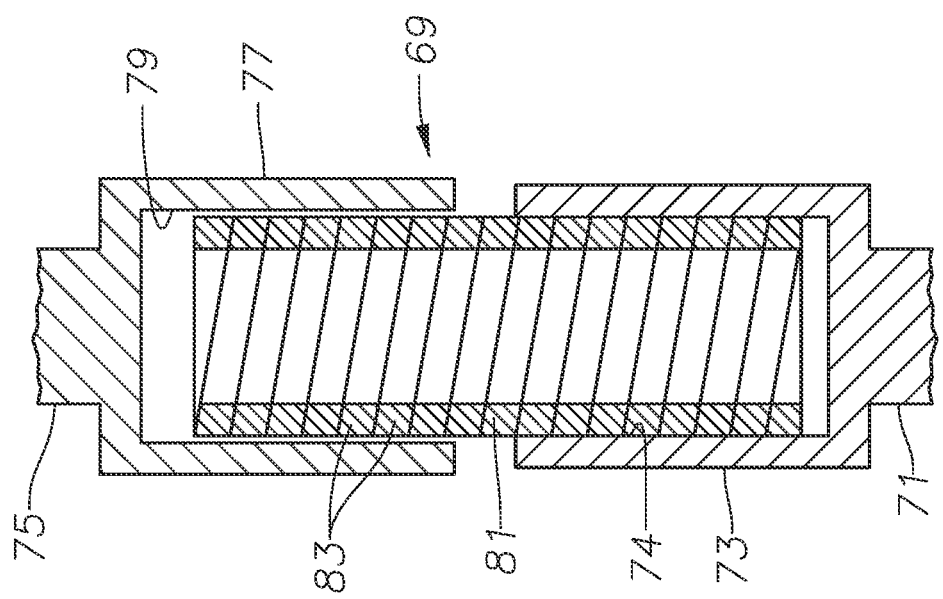
FIG. 6 is a schematic sectional view of an alternate embodiment of the coupling of FIG. 2.

In the alternate embodiment of FIG. 6, coupling 69 has a lower adapter 71 that may have a splined socket similar to socket 45 in FIG. 2. Lower hub 73 joins lower adapter 71 and comprises an upward facing receptacle with an open upper end and an inward-facing cylindrical sidewall 74. Upper adapter 75 and upper hub 77 may be the same as in FIG. 2-3. Upper hub 77 is a downward-facing receptacle with an inward-facing sidewall 79.

Clutch spring 81 may be the same as clutch spring 53 of FIG. 2. In this example, the lower portion of helical turns 83 will be in an initial frictional or interference engagement with sidewall 74 of lower hub 73. The upper portion of helical turns 83 will initially not be in gripping engagement with upper hub sidewall 79. Rather the upper portion of helical turns 83 will be spaced slightly from or lightly touching upper hub sidewall 79. The touching, if any, would only be a few degrees of contact between clutch spring 81 and upper hub sidewall 79 due to manufacturing tolerances. No complete 360 degree contact between clutch spring 81 and upper hub sidewall 79 occurs initially.

When motor 21 (FIG. 1) drives motor shaft 22, lower hub 73 will turn clutch spring 81 in unison because of the initial interference fit with lower hub sidewall 74. The driving direction rotation causes the lower portion of helical turns 83 to expand and more tightly grip lower hub sidewall 74. The driving direction rotation of lower hub 73 causes the diameter of the upper helical turns 83 to expand and commence gripping engagement with upper hub sidewall 79. The rotation transfers from upper hub 77 to pump shaft 18 (FIG. 1). Rotation of pump shaft 18 in either direction while motor power is off does not cause lower hub 73 to rotate for the same reasons as explained in connection with the first embodiment.

Figure 7:
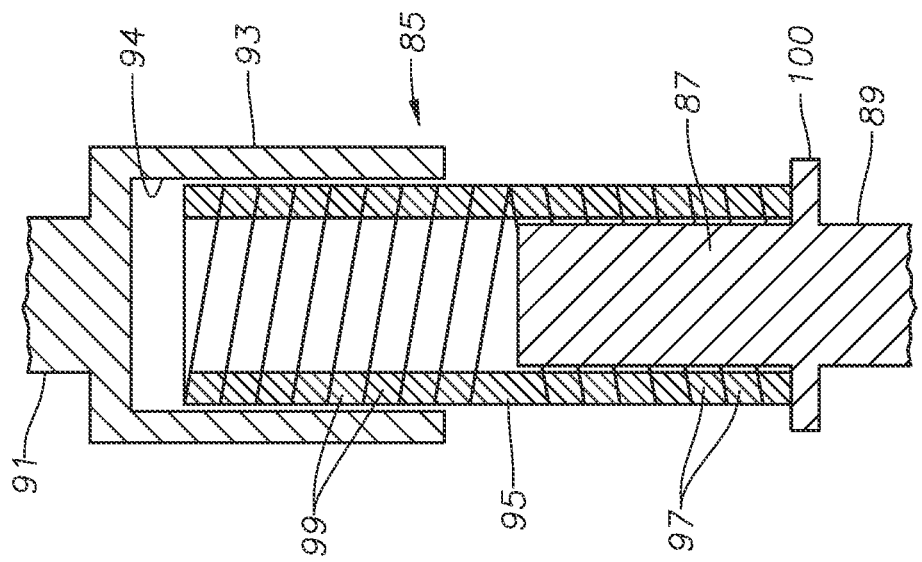
FIG. 7 is a schematic sectional view of another alternate embodiment of the coupling of FIG. 2.

In the embodiment of FIG. 7, clutch coupling 85 has a lower hub 87 that is a cylindrical rod, similar to lower hub 43 in FIG. 2. A lower adapter 89 with a splined socket depends downward from lower hub 87 and may be integral with it. An upper adapter 91 and an upper hub 93 having an inward-facing sidewall 94 may be constructed as in FIG. 2 or FIG. 7. Upper hub 93 is also a receptacle with an inward-facing sidewall 94.

In this example, clutch spring 95 differs from clutch spring 53 (FIG. 2) in that it has lower helical turns 97 that turn or extend in the opposite direction to upper helical turns 99. Lower helical turns 97 extend in the same direction as the direction of rotation of motor shaft 22 (FIG. 1) when motor 21 is powered. Lower helical turns 97 are inserted over lower hub 87 with an initial interference. Rotation of lower hub 87 by motor shaft 22 causes lower helical turns 97 to contract and more tightly grip lower hub 87. Upper helical turns 99 are initially spaced from gripping engagement with upper hub sidewall 94. The driving direction rotation of clutch spring 95 causes upper helical turns 99 to expand into tight gripping engagement with upper hub sidewall 94.

Figure 8:
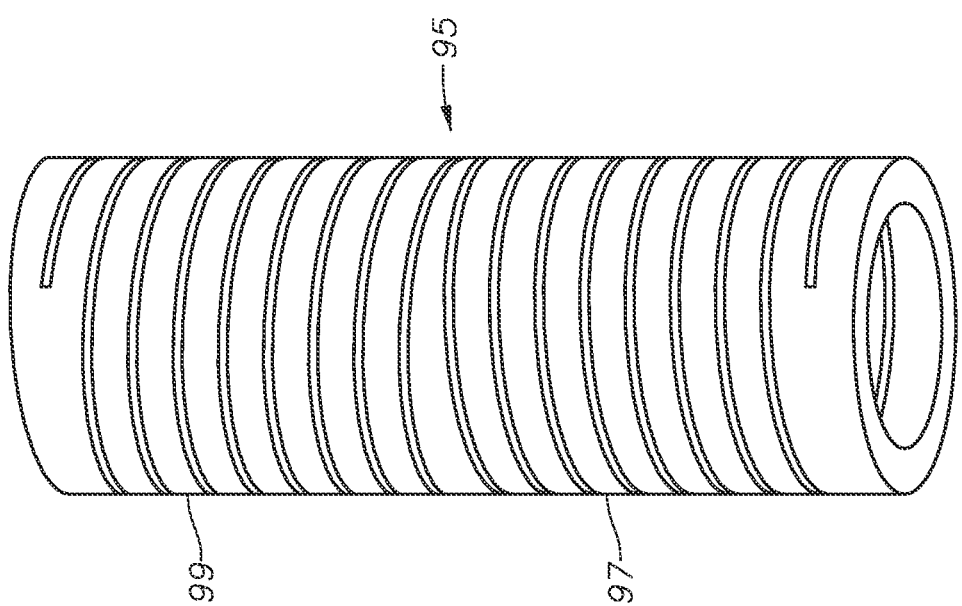
FIG. 8 is a perspective view of the spring clutch of the coupling of FIG. 7, shown removed from the coupling.

Lower adapter 89 may have an outer flange 100, and the lower end of clutch spring 95 may abut flange 100. FIG. 8 is a pictorial representation of clutch spring 95.

Figure 9:
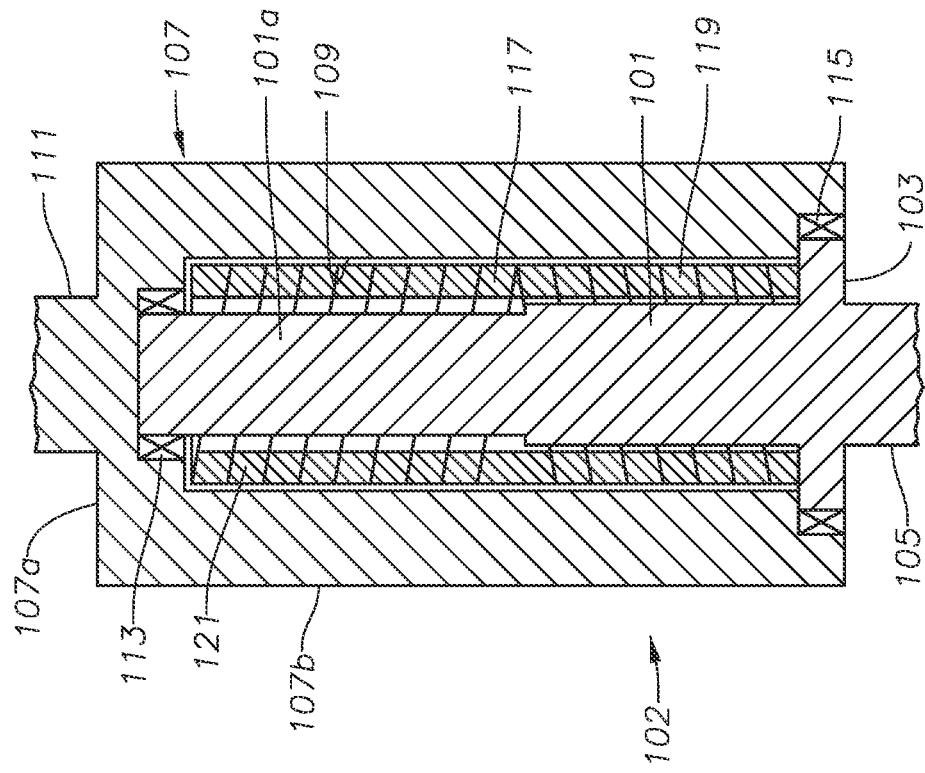
FIG. 9 is a schematic sectional view of another alternate embodiment of the coupling of FIG. 2.

Clutch coupling 102 in FIG. 9 is another embodiment. It has a lower hub 101 that is a rod or pedestal with a cylindrical exterior. Lower hub 101 has an upper extension 101*a* that is also a rod and may be smaller in outer diameter than lower hub 101. A lower adapter 105 joins lower hub 101 and has a socket for receiving motor shaft splined end 37 (FIG. 2). Lower adapter 105 has an external flange 103. Lower hub 101, flange 103, lower adapter 105, and upper extension 101*a* are secured and rotate together.

Upper hub 107 is a receptacle having a closed upper end 107*a* and a cylindrical wall 107*b* with an inward-facing sidewall 109. Upper end 107*a* and cylindrical wall 107*b* are secured to each other and rotate together. An upper adapter 111 joins and is secured to closed upper end 107*a* of upper hub 107. Upper adapter 111 has a splined socket for receiving seal section shaft lower splined end 41 (FIG. 2). Lower hub extension 101*a* extends upward in upper hub 107 and may be in abutment with upper closed end 107*a*. However, upper closed end 107*a* is rotatable relative to lower hub extension 101*a* when pump shaft 18 (FIG. 1) is rotating and motor shaft 22 not rotating. Bearings 113 are shown schematically at the interface of the top of lower hub extension 101*a* and closed upper end 107*a* to facilitate rotation of upper closed end 107*a* relative to lower hub extension 101*a*. Upper hub cylindrical wall 107*b* extends down into an interface with lower hub flange 103. Bearings 115 are located at this interface for improved alignment and performance. Bearings 115 enable rotation of upper hub cylindrical wall 107*b* relative to lower hub flange 103 when pump shaft 18 (FIG. 1) is rotating and motor shaft 22 not rotating.

Clutch spring 117 may be constructed the same as clutch spring 95 of FIG. 7. Clutch spring 117 has lower helical turns 119 that encircle lower hub 101 with an initial interference fit. The outer diameter of lower helical turns 119 is separated from upper hub inward-facing sidewall 109 by a clearance. Clutch spring 117 has upper helical turns 121 that extend helically in an opposite direction to lower helical turns 119 in this example. Upper helical turns 121 may have the same inner and outer diameters as lower helical turns 119. However, the inner diameter of upper helical turns 121 is separated from lower hub extension 101*a* by an annular clearance because of the smaller outer diameter of lower hub extension 101*a* than lower hub 101. The outer diameter of upper helical turns 121 may initially be spaced a slight distance from upper hub sidewall 109 as in the other embodiments.

When motor shaft 22 (FIG. 1) is being driven by motor 21, clutch spring 117 rotates in the same direction, causing lower helical turns 119 to contract and more tightly grip lower hub 101. Upper helical turns 121 expand into gripping engagement with upper hub sidewall 109, causing upper hub 107 to rotate in unison with lower hub 101. When motor 21 is off, and pump shaft 18 (FIG. 1) begins to spin in either direction, upper hub 107 will rotate in unison. However, clutch spring 117 does not rotate because upper helical turns 121 will have retracted in diameter enough to lose gripping engagement with upper hub sidewall 109 once motor shaft 22 stops driving. As a result, lower hub 101 and motor shaft 22 do not turn. Bearings 113 and 115 facilitate the rotation of upper hub 107 relative to lower hub 101. An alternate embodiment (not shown) using alignment bearings similar to bearings 113 and 115 could employ shrink ring 57 and clutch spring 53 (FIG. 3) instead.

Referring now to FIG. 10, shown in a side sectional view is an example of an alternate embodiment of a connector 130 optionally for use in coupling together the shafts 18, 24, 22 (FIG. 1). The connector 130 includes an outer housing 132 shown as a generally annular structure, with an inner chamber 133, and one end connected to an annular base 134. Alternatively housing 132 and base 134 are combined in a single structure. A bore 135 extends axially through base 134 and along axis $A_X$. An end of housing 132 distal from base 134 connects to a section 136 and an end of the base 134 distal from housing 132 connects to a section 138. Sections 136, 138 optionally represent the different sections of ESP 13 (FIG. 1), such as pump section 21, seal section 23, and pump section 17. Further optionally, connector 130 is provided in place of connector 27 and/or in place of connector 29. Exposed generally coaxially within base 134 is an adapter 140 with a splined socket 142 formed axially within.

One side of the socket 142 is formed to receive an end of a shaft 144 within. In an example, shaft 144 represents the motor shaft 22 or the seal shaft 24 (FIG. 1). In the example shown adapter 140 rotationally couples shaft 144 with a drive hub assembly 146 shown within housing 132; assembly 146 includes a drive hub shaft 148 that extends axially within the base bore 135 and forms a splined socket 142 to mate with shaft 144. A drive hub receptacle 150 also joins an end 149 of shaft 148 on the opposite end of adapter 140 and disposed within bore 135. Receptacle 150 includes a base 151 shown extending radially from an end of shaft 148 within housing 132 and annular sidewalls 152 that project axially away from the outer periphery of base within chamber 133. A drive hub cavity 154 is defined within the sidewalls 152 that faces away from shaft 148. Also included within the connector 130 is a driven hub assembly 156 that includes an elongate driven hub shaft 158 that projects axially away from drive hub assembly 146 to outside of housing 132. Driven hub assembly 156 also includes a driven hub receptacle 160 which is made up of a base 161 projecting radially from and end of shaft 158 inside housing 132 and annular sidewalls 162 within the chamber 133 that project axially from an outer periphery from base and towards assembly 146.

The shafts 158, 148 project through openings 164, 165 that are formed through bulkheads 166, 167. Bulkhead 166 is formed on an end of housing 132 opposite from base 134 and bulkhead 167 is formed on an end of base 134 adjacent to housing 132. Bearings 168, 169 are disposed respectively within the openings 164, 165 and between shafts 158, 148. Driven hub assembly 156 includes a cavity 170 formed within the sidewalls 162. In the example shown, the connector 130 and attached shaft 144 make up part of a drive train 171 for translating rotational energy from the motor 21 to the pump 17 (FIG. 1). For the purposes of discussion herein regarding the drive train 171, uphole refers to towards the pump 17 and downhole refers to towards the motor 21. In examples described in more detail below the drive train 171 optionally includes a break; a break refers to a location or locations where adjacent axial sections of the drive train 171 are rotationally decoupled from one another or are coupled with something else that restricts or prohibits rotation of the drive train 171.

Still referring to FIG. 10, a helical spring 172 is shown inside housing 132 and having illustrated with a lengthwise portion within the drive hub cavity 154 and another lengthwise portion within the driven hub cavity 170. In the example shown sidewalls 152, 162 fully circumscribe spring 172 and a length of spring 172 is substantially the same as the combined lengths of cavities 154, 170; in alternatives the length of spring 172 differs from the combined lengths of cavities 154, 170. As shown, helical spring 172 has a generally annular configuration with an optional cylindrical spacer 174 inserted in a bore extending axially within spring 172. Further optionally dowels 175 insert into axial openings from on opposing sides of spacer 174 and that register with openings formed axially within bases 151, 161. An optional ring bearing 176 is shown provided in the annular space between an outer surface of the sidewalls 152, 162 and an inner surface of housing 132. Bearing 176 is an annular member with an axial length greater than its radius and that circumscribes an interface where the sidewalls 152, 162 abut one another.

FIG. 10A illustrates in detail a portion of the connector 130 of FIG. 10 and includes an interface I that represents different portions of spring 172. A taper 177 is schematically shown along an inner surface of sidewalls 162 representing a change in a diameter of chamber 133. Interface I is positioned in a plane where the terminal ends of the sidewalls 152, 162 are in abutting contact. A fixed portion 178 is a portion of spring 172 within and circumscribed by sidewalls 152 that as shown is press-fit within sidewalls 152 so that drive hub assembly 146 and spring are rotationally coupled with one another. In this example, rotation of shaft 148 in the clockwise direction of curved arrow $A_R$ causes rotation of spring 172 in the same rotational direction. A flex portion 180 is a portion of spring 172 within and circumscribed by sidewalls 162. In the example shown while the spring 172 is static or otherwise not rotating a radial clearance 182 is shown between an outer surface of flex portion 180 and an inner surface of the sidewalls 162. Also provided in FIG. 10A is a length $L_{178}$ representing an axial length of the fixed portion 178 along axis $A_X$ and a length $L_{180}$ representing a length of the flex portion 180 along axis $A_X$. In the example shown length $L_{180}$ is greater than length $L_{178}$.

Figure 11:
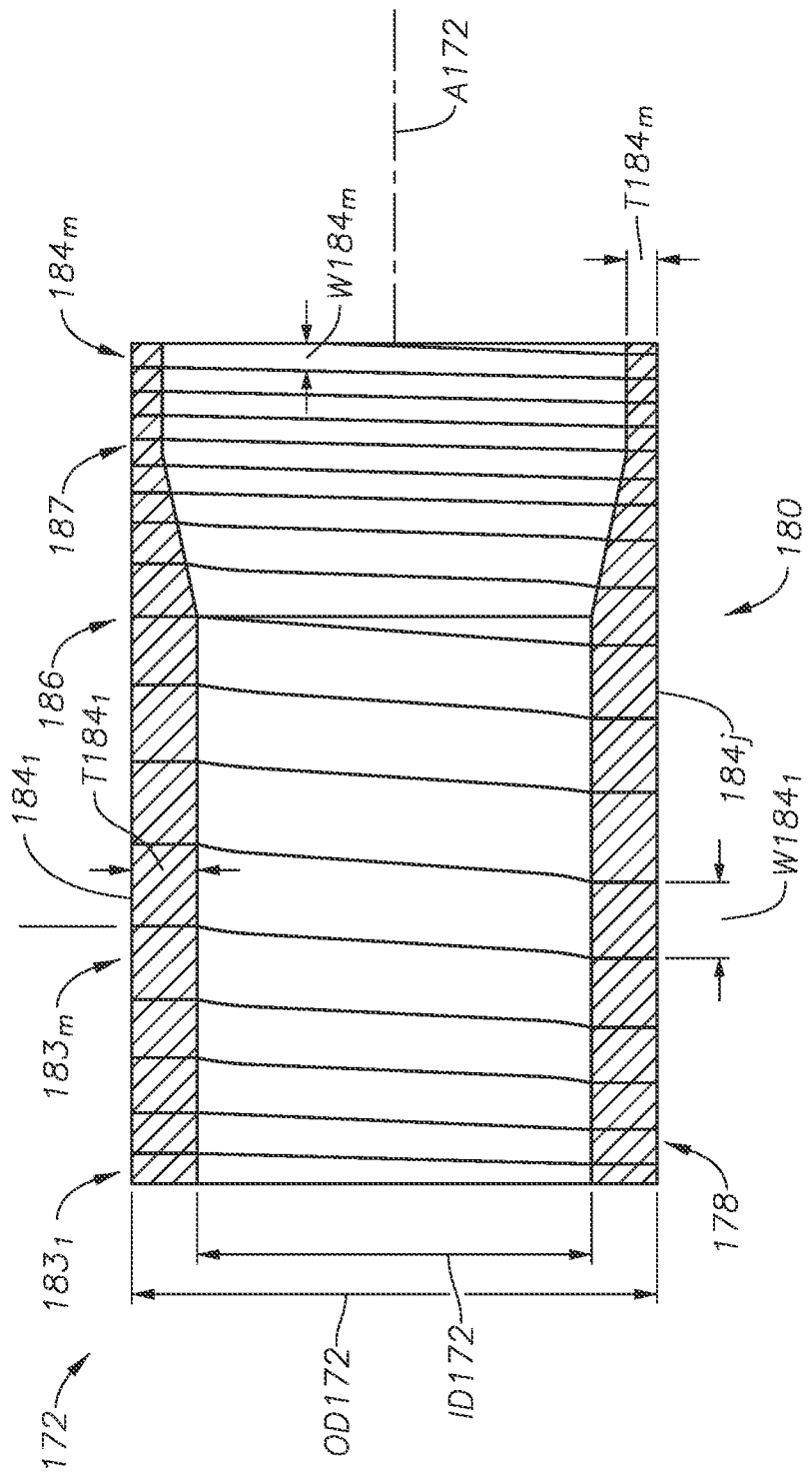
FIG. 11 is a side sectional view of an example of a spring for use with the coupling of FIG. 10.

Referring now to FIG. 11 a side sectional view of spring 172 is shown made up of coils $183_1$-$183_n$ within the fixed portion 178 of spring 172 and coils $184_1$-$184_m$ in the flex portion 180 spring. In this illustrated alternative the coil widths $W184_{1-n}$ vary along spring axis $A_{172}$ and at a transition experience an increased width variance from a transition 186 to a terminal end of spring 172 at coil $184_m$. Similarly, radial thicknesses $T184_{1-m}$ of the coils $184_1$-$184_m$ successively decrease up until a second transition 187 and remain generally constant up to coil $184_m$. In the example of FIG. 11 spring 172 is in a static or non-rotating configuration and with a spring outer diameter $OD_{172}$ that is substantially constant along the entire axial length of spring 172. Also spring inner diameter $ID_{172}$ is shown generally constant along the axial length of the fixed portion 178 and along an axial length of flex portion 180 until $ID_{172}$ increases at transition 186 and stays generally constant from second transition 187 to the terminal end of spring 172. In an alternative, spring inner diameter $ID_{172}$ increases entire distance from transition 186 until the last coil $184_m$.

Figure 12A:
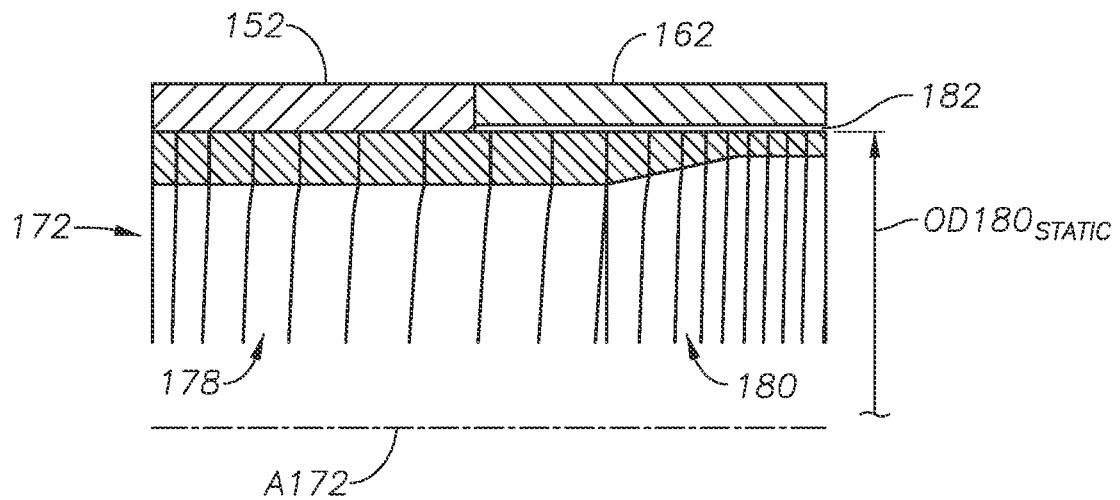
FIG. 12A is a side sectional view of a portion of the example coupling of FIG. 10 shown in a non-operating mode.
Figure 12B:
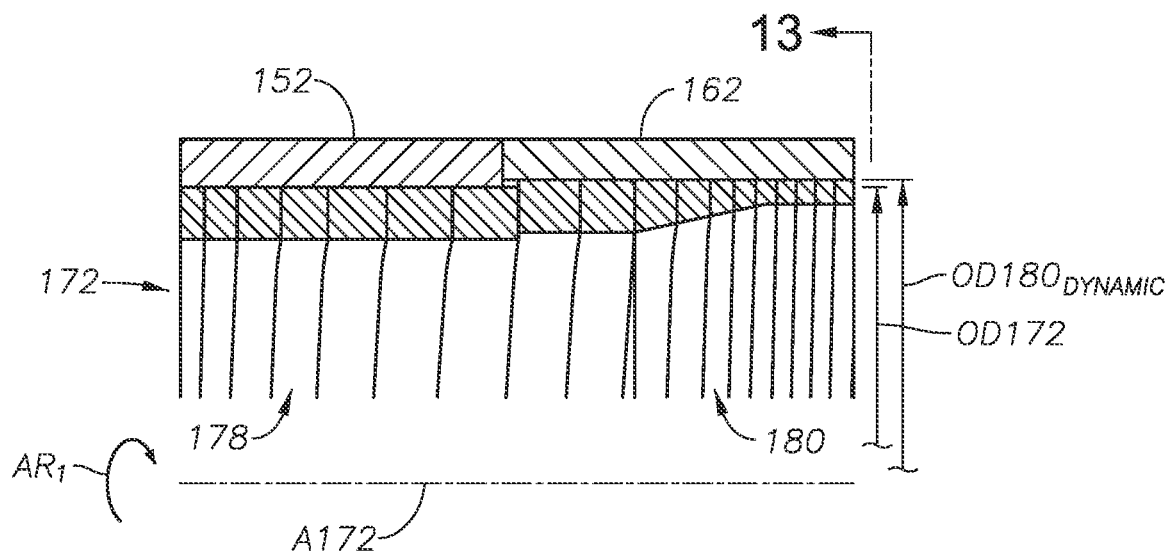
FIG. 12B is a side sectional view of a portion of the example coupling of FIG. 10 shown in an operating mode.

Illustrated in a side sectional view in FIG. 12A is an example representation of the spring 172 in a rotationally static configuration, when spring 172 is rotationally static a clearance 182 exists between an inner surface of sidewalls 162 and flex portion outer diameter $OD180_{static}$. Shown in FIG. 12B is an example of spring 172 rotating (or being rotated) in a first direction $A_{R1}$. In a non-limiting example, spring 172 is rotated by energizing motor 21 (FIG. 1) to rotate shafts 22, 144 and drive hub assembly 146 that in turn rotate spring 172 in the direction $A_{R1}$ through the fixed relationship between spring 172 and drive hub receptacle 150. Rotating spring 172 in the direction of $A_{R1}$ radially expands at least some of the outer diameter of coils $184_{1-m}$ in the flex portion 180 to have an outer diameter $OD180_{dynamic}$. Radially expanding the coils $184_{1-m}$ brings the outer surface of flex portion 180 into engaging contact with the inner surface of sidewalls 162 and rotationally couples spring 172 with driven hub assembly 156 (FIG. 10) so that rotation forces are transmitted through connector 130 and continues rotational motion along the drive train 171 to drive pump 17 (FIG. 1). In a non-limiting example of operation, the strategic sizing of the widths $W184_{1-m}$ and the thicknesses $T194_{1-m}$ of the coils 184 of spring 172 affects the physical characteristics of the flex portion 180 so that flex portion 180 when rotated in direction $A_{R1}$ becomes rotationally coupled with the driven hub assembly 156.

Figure 13:
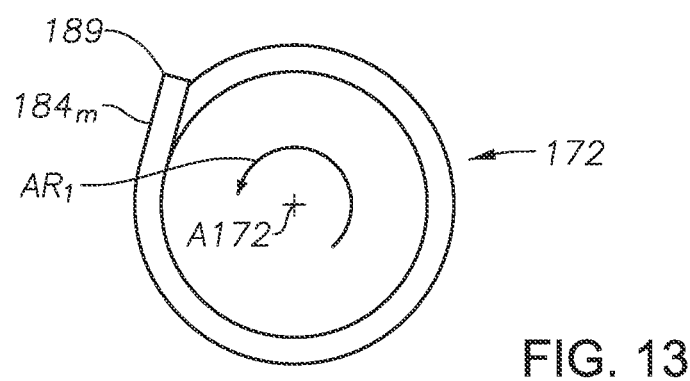
FIG. 13 is an axial view of the spring of FIG. 11 in a rotating mode.

Shown in FIG. 13 is a downhole directed axial view of an end of spring 172 in the rotational mode and being rotated in clockwise direction $A_{R1}$ and about axis $A_{172}$. As shown, a free end 189 of spring 172 and on coil 184$_m$ is urged radially outward due to rotational of spring 172. The outer radial displacement of coils 184$_{1-m}$ is in response to centrifugal force imparted onto the spring 172 when being rotated.

When spring 172 is dynamically static, such as when motor 21 (FIG. 1) is not being energized and not creating rotation in its shaft 22, coils 184$_{1-m}$ of flex portion 180 are in their static outer diameter OD180$_{static}$ so that a clearance 182 (FIG. 12A) exists between spring 172 and the driven hub assembly 156. Due to the clearance 182, rotation of the driven hub receptacle 160 is not translated to the spring 172 and no rotational forces are transmitted through the connector 130; which blocks reverse rotation of motor 21 (FIG. 1). Referring to FIG. 10, in alternatives a counterclockwise rotational force, illustrated as A$_{R2}$ and in a direction opposite A$_{R1}$, is applied to shaft 158 on a side opposite spring 172. For the purposes of discussion herein, there is initially a clearance 182 between spring 172 and the driven hub assembly 156. In the example shown, when rotating counterclockwise centrifugal forces do expand spring 172. Any frictional forces between opposing surfaces of spring 172 and receptacle 150 resulting from rotating spring 172 counterclockwise are insufficient to engage spring 172 with receptacle 150, so that rotational force is not transmitted along the entire length of drive train 171 if shaft 158 is rotated counterclockwise as described above. A break B is defined in the drive train 171 by the existence of the clearance 182. The hazards of reverse rotation to motor 21 are avoided with use of connector 130, such as from reverse rotation is from a component in the drive train 171 that is uphole of the connector 130. In one embodiment a break is selectively formed in the drive train 171 when there is no rotation of spring 172. Optionally, spring 172 is configured so that a break in the drive train 171 is formed when the spring 172 is rotated in a direction A$_{R2}$. In a non-limiting example of operation, motor 21 (FIG. 1) is energized by providing electrical current to cable 25 from power source (not shown) on surface. Energizing motor 21 rotates shaft 22 and shaft 144 (FIG. 10) in rotational direction A$_{R1}$. As the speed of motor 21 increases and reaches a rotational speed in a range of about 200 revolutions per minute ("rpm") to about 300 rpm (and in direction A$_{R1}$), spring 172 begins to radially expand and rotationally engage driven hub receptacle 160. Rotationally engaging driven hub receptacle 160 with spring 172 causes driven hub assembly 156 to rotate at the same rotational speed as spring 172, and in turn rotates drive train 171 and pump shaft 18 (FIG. 1). In this example, motor 21 speed continues to increase until reaching a normal operating speed of about 3600 rpm and continues to operate at that speed until its operation is adjusted such as by suspending the supply of electricity. In alternatives when a column of fluid is collected in production tubing 15 (FIG. 1) uphole from the pump 17, a back flow of the fluid through the pump 17 and across its impellers (not shown) rotates impellers and pump shaft 18 in a counterclockwise direction, which in turn rotates shaft 158 in counterclockwise direction AR$_2$. As discussed above, the break B in the connector 130 is formed by clearance 182 (FIG. 10A) when shaft 158 rotates in counterclockwise direction AR$_2$ so that adjacent sections of the drive train 171 (i.e., driven hub assembly 156 and drive hub assembly 146) are rotationally decoupled from one another.

Figure 14:
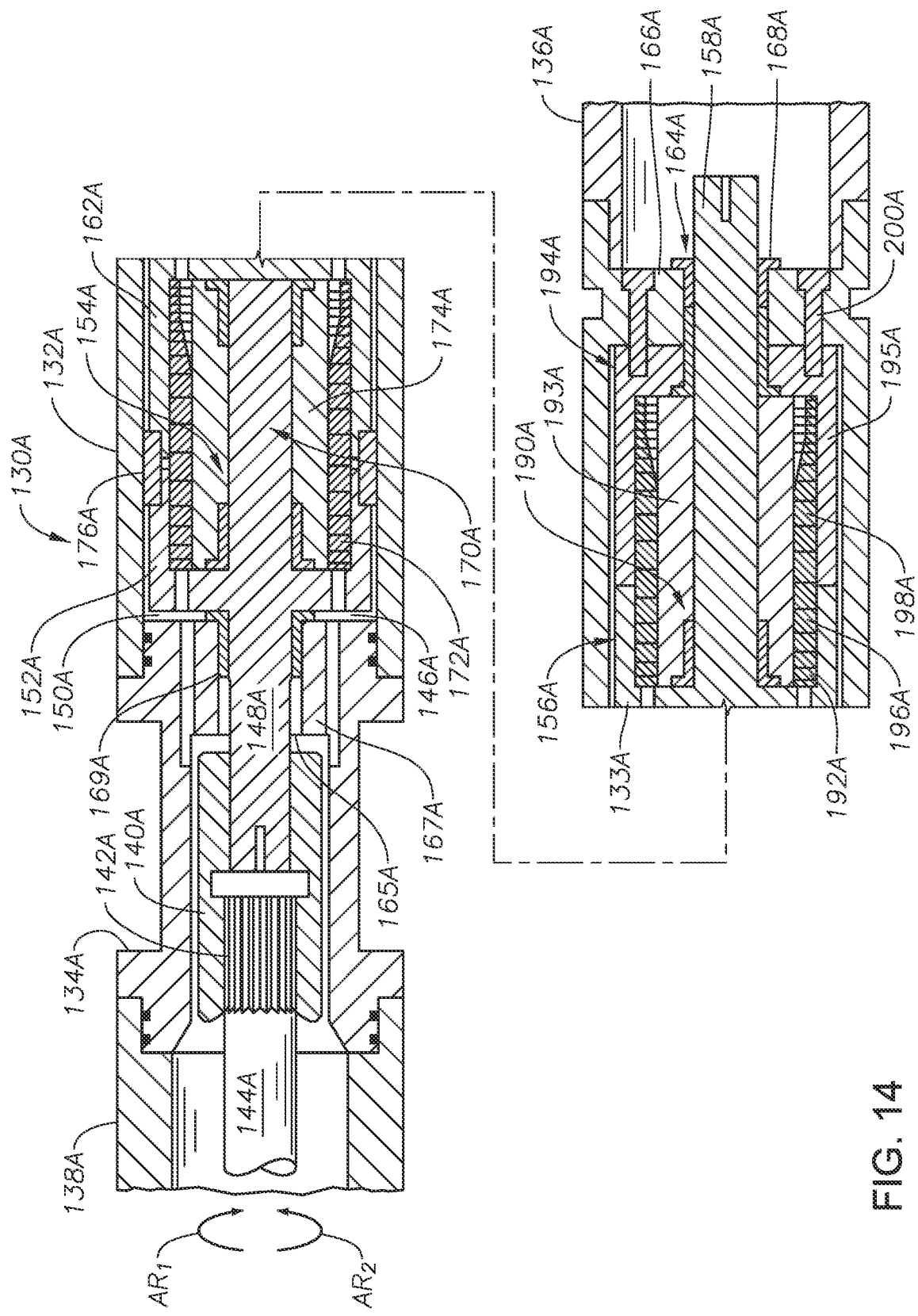
FIG. 14 is a schematic side sectional view of another alternate embodiment of the coupling of FIG. 2.

Referring now to FIG. 14, shown in a side sectional view is an alternate example of connector 130A that like the embodiment of FIG. 10 includes a housing 132A coupled to a base 134A, a chamber 133A inside housing 132A, and sections 136A, 138A on opposing ends of housing 132A and base 134A. An adapter 140A provides coupling between shaft 144A and shaft 148A of a drive hub assembly 146A. The example of FIG. 14 further includes a driven hub assembly 156A with a downward facing cavity 170A and an upward-facing receptacle 190A formed by sidewalls 162A that extend axially past the base portion of the driven hub assembly 156A and away from drive hub assembly 146A. Within receptacle 190 is a clutch spring 192A having a helical orientation opposite to that of spring 172A. A spacer 193A is provided in the annular space between shaft 158A and inner surface of spring 192A and an insert 194A is disposed in chamber 133A with a radial base and axial sidewalls 194A that circumscribe a portion of spring 192A. Spring 192A has a fixed portion 196A that is affixed to the upward-facing receptacle 190A. and includes a flex portion 198A that is circumscribed by sidewalls 195A. In this example, by rotating shaft 158A in a direction opposite A$_{R1}$ shown in FIG. 14 as A$_{R2}$, projects coils in flex portion 198A radially outward and into engaging contact with an inner surface of sidewalls 195A and arrests rotation of shaft 158A. Optionally, bolts 200A are shown axially inserted through a bulkhead 166A and for securing the inserts 194A within housing 132A.

The present invention described herein, therefore, is well adapted to carry out the objects and attain the ends and advantages mentioned, as well as others inherent therein. While only a few embodiments of the invention have been given for purposes of disclosure, numerous changes exist in the details of procedures for accomplishing the desired results. These and other similar modifications will readily suggest themselves to those skilled in the art and are intended to be encompassed by the scope of the claims. For example, the spring clutch could be mounted in the coupling between the seal section shaft 24 and the pump shaft 18 instead of between the motor shaft 22 and seal section shaft 24.

What is claimed is:

1. An electrical submersible well pump assembly ("ESP") comprising:
   an electrical motor;
   a pump; and
   a drive train comprising,
      a motor shaft coupled to the electrical motor,
      a pump shaft coupled to the pump; and
      a connector comprising,
         a driven hub assembly comprising,
            a driven hub shaft having an end coupled with the pump shaft,
            a driven hub receptacle connected to an end of the driven hub shaft that is distal from the pump shaft, and
            a driven hub cavity formed in the driven hub receptacle;
         a helical spring comprising a fixed portion and a flex portion that inserts into the driven hub cavity,
         when the spring is rotationally static an outer surface of the flex portion is spaced radially inward from an inner surface of the driven hub receptacle and when the spring is rotated in a first direction the flex portion outer surface radially expands into contact with the inner surface of the driven hub receptacle so that the spring is rotationally coupled to the driven hub assembly,
         a drive hub assembly having an end coupled to the motor shaft and an opposing end affixed to the fixed portion of the spring.

2. The ESP of claim 1, wherein energizing the electrical motor rotates the motor shaft and drive hub assembly to rotate the spring in the first direction.

3. The ESP of claim 1, wherein coils in the flex portion have a radial thickness that reduces with distance from the fixed portion.

4. The ESP of claim 1, wherein coils in the flex portion have an axial thickness that reduces with distance from the fixed portion.

5. The ESP of claim 1, wherein the drive hub assembly further comprises a drive hub receptacle, a drive hub cavity in the drive hub receptacle that receives and attaches to an end of the fixed portion, a drive hub shaft having an end that attaches to the electrical motor and an opposing end that attaches to the drive hub receptacle.

6. The ESP of claim 5, wherein a length of the spring disposed in the driven hub receptacle exceeds a length of the spring disposed in the drive hub receptacle.

7. The ESP of claim 1, further comprising a seal section disposed between the electrical motor and the pump, and wherein the drive train extends through the seal section.

8. The ESP of claim 1, wherein when the spring is rotated in a second direction that is opposite the first direction, the outer surface of the flex portion is spaced radially inward from the sidewalls of the driven hub receptacle and the driven hub receptacle is freely rotatable with respect to the spring.

9. The ESP of claim 1, further comprising a clutch spring for arresting rotation of the driven hub assembly.

10. An electrical submersible well pump assembly ("ESP") comprising:
   an electrical motor having a motor shaft is rotated in a first direction when the electrical motor is energized;
   a pump having a pump shaft; and
   a drive train comprising a connector with opposing ends coupled to the motor and pump shafts, the connector comprising,
      drive and driven hub assemblies that each comprise receptacles and shafts connected to the receptacles that couple respectively to the pump shaft and motor shaft, and
      a helical spring with an end affixed in the drive hub assembly receptacle and an opposing end inserted into the driven hub assembly receptacle that when rotationally static is spaced radially inward from inner sidewalls of the driven hub assembly receptacle and that when rotated in the first direction expands radially outward into engaging contact so that the drive and driven hub assemblies are rotationally coupled.

11. The ESP of claim 10, wherein the helical spring comprises coils, and wherein the coils in the driven hub assembly have a radial thickness that reduces with distance from the drive hub assembly.

12. The ESP of claim 10, wherein the helical spring comprises coils, and wherein the coils in the driven hub assembly have an axial thickness that reduces with distance from the drive hub assembly.

13. The ESP of claim 10, wherein when the spring is rotated in a direction that is opposite the first direction, the outer surface of the spring is spaced radially inward from the sidewalls of the driven hub receptacle and the driven hub receptacle is freely rotatable with respect to the spring.

14. An electrical submersible well pump assembly ("ESP") comprising:
   an electrical motor comprising a motor shaft that is rotated in a first direction when the electrical motor is energized;
   a pump comprising a pump shaft; and
   a drive train having an end rotationally coupled with the motor shaft and an opposing end coupled with the pump shaft, the drive train comprising,
      a connector with a helical spring that when rotated in the first direction radially expands and couples with a driven member in the connector to transmit rotational force through the connector, and that when rotationally static decouples from the driven member and defines a break in the drive train.

15. The ESP of claim 14, wherein the break is in the drive train when the spring is rotated in a direction opposite to the first direction.

16. The ESP of claim 14, the connector further comprising a drive member affixed to an end of the spring distal from the driven member, and wherein radial and axial dimensions of the spring are reduced with distance away from the drive member.

17. The ESP of claim 14, wherein the driven member comprises an annular receptacle that defines a cylindrically shaped cavity in which the spring is inserted, and wherein a taper is formed along an inner surface of the receptacle.

\* \* \* \* \*